United States Patent [19]
Dunlap

[11] Patent Number: 5,777,730
[45] Date of Patent: Jul. 7, 1998

US005777730A

[54] SYSTEMS, METHODS AND APPARATUS FOR INSPECTING STATOR CORES

[75] Inventor: Robert A. Dunlap, Fort Wayne, Ind.

[73] Assignee: General Electric Company, Fort Wayne, Ind.

[21] Appl. No.: 949,813

[22] Filed: Oct. 14, 1997

Related U.S. Application Data

[63] Continuation of Ser. No. 547,588, Oct. 24, 1995, abandoned.
[51] Int. Cl.$^6$ ...................................................... G01N 21/00
[52] U.S. Cl. .......................... 356/237; 356/241; 356/386; 356/387
[58] Field of Search .................................... 356/384–387, 356/237, 241; 324/233, 545, 242

[56] References Cited

U.S. PATENT DOCUMENTS

| | | | |
|---|---|---|---|
| 4,480,264 | 10/1984 | Duschl | 356/384 |
| 4,657,395 | 4/1987 | Shiraishi et al. | 356/385 |
| 4,678,337 | 7/1987 | Cohen et al. | 356/387 |
| 4,772,128 | 9/1988 | Vinarub et al. | 356/384 |
| 4,978,223 | 12/1990 | Kutchenriter et al. | 356/384 |
| 5,563,808 | 10/1996 | Tuck et al. | 356/384 |

OTHER PUBLICATIONS

Brochure by Lasiris Inc. entitled *Laser Diode Structured Light Products*.
Brochure by Adept Technology, Inc. entitled *AdeptVision VME—Vision Inspection for Quality Control*.
Adept Technology, Inc. Product Description and Product Specification pages for AIM VisionWare.
Adept Technology, Inc. Product Description and Product Specification pages for AdeptVision AGS–GV.
LaserMike Inc. brochure on its 183B Series Benchtop Optical Micrometers.
Keyence Corporation of America's Advertisement of a CCD Laser Micrometer, Model VG, from Jun. 1995 *IEN*.

*Primary Examiner*—Hoa Q. Pham
*Attorney, Agent, or Firm*—Enrique J. Mora

[57] ABSTRACT

Methods and apparatus for automated inspection of stator cores are described. In one embodiment, a coherent light transmitter and a light detector are optically aligned so that the detector is in the path of an optical signal emitted from the light transmitter when such signal propagates substantially uninterrupted. The light transmitter and detector are also spaced from each other at a distance sufficient to allow a stator core to be moved, e.g., translated or rotated, therebetween. Output signals from the detector are processed to determine whether the core is acceptable.

20 Claims, 1 Drawing Sheet

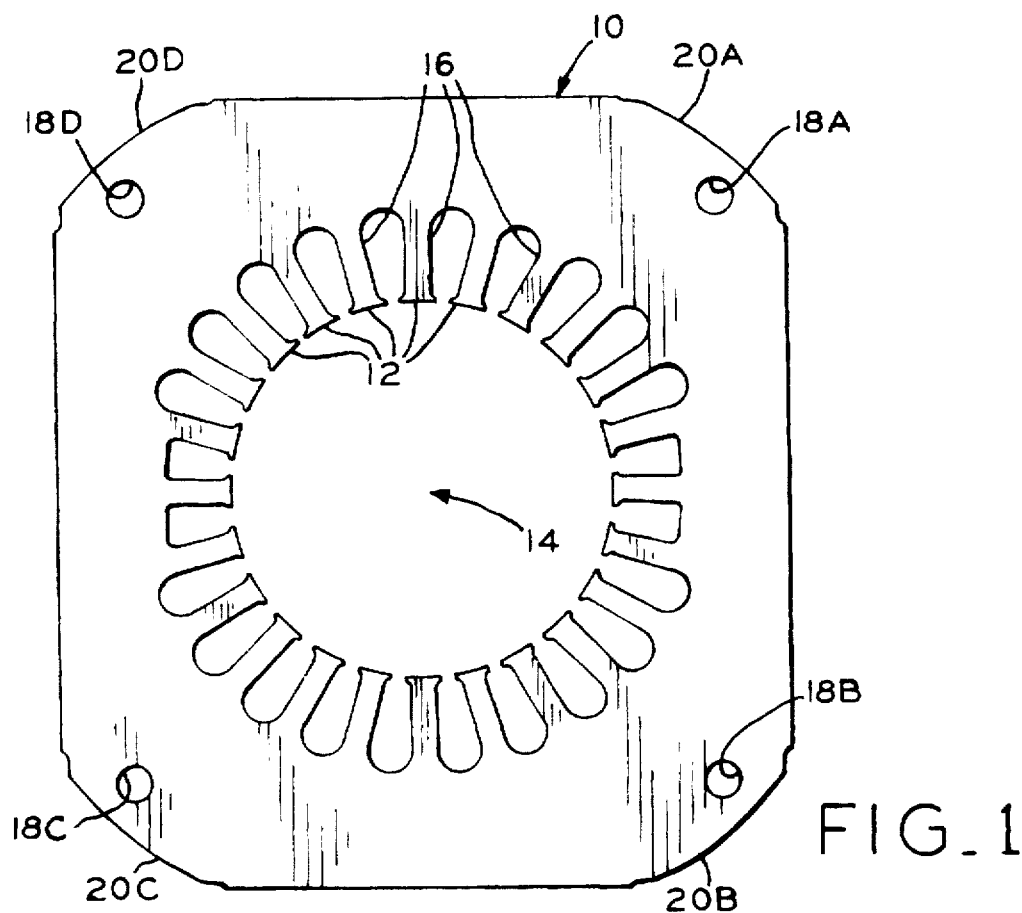
FIG_1
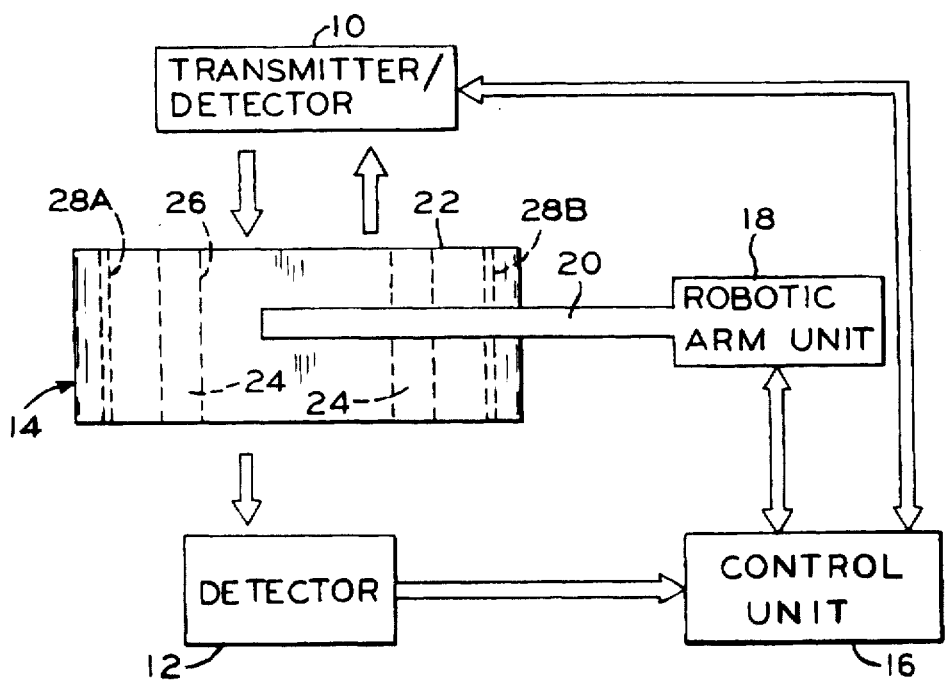
FIG_2

SYSTEMS, METHODS AND APPARATUS FOR INSPECTING STATOR CORES

This application is a continuation of application Ser. No. 08/547,588, filed Oct. 24, 1995 now abandoned.

FIELD OF THE INVENTION

This invention relates generally to stators for dynamoelectric machines and, more particularly, to methods and apparatus for inspecting stator cores.

BACKGROUND OF THE INVENTION

The stator of a dynamoelectric machine such as an electric motor or generator typically includes a core of magnetic material having an axially extending bore for receiving a rotor. The core typically is formed from a plurality of identical laminations which are aligned and arranged in a stack held together by clips. In one particular embodiment, each lamination includes a plurality of teeth which extend radially into the bore. Slots between each of the teeth extend radially outwardly from the bore. The ends of the teeth and the open ends of the slots define the periphery of the bore. A plurality of coils formed from insulated conductive wire, sometimes referred to as magnet wire, are inserted into selected core slots. The coils are interconnected to form coil groups or poles.

In the one embodiment, each stator lamination also includes a plurality of through-holes, or bolt holes, which are utilized for securing end frame assemblies to the stator core. For example, if a stator lamination has a substantially square shape, a through-hole may be positioned substantially at each corner of the lamination. When such laminations are arranged in a stack, the through-holes of each lamination align with the respective through-holes in the other laminations.

Each stator lamination typically is formed utilizing a high-speed press machine which forces a die through a strip of steel material. After being "punched" from the steel material, each lamination may be heat-treated in a furnace. Such heat treatment may cause a highly resistive oxide layer to be formed on the lamination surfaces. Such an oxide layer may improve performance of an electric motor by, for example, reducing lamination-to-lamination losses.

In addition to the process steps described above, many other process steps are performed in assembling a stator core. For example, the laminations may be stacked and then interlocked, or clipped, together. At many process steps, the laminations may be handled or processed by machinery, and such handling and processing may distort the dimensions of the laminations. For example, heat treatment of a lamination may cause some distortion of the lamination. Significant dimensional distortion of the lamination may result in failure of the assembled motor.

In an attempt to ensure that the dimensions of the laminations are acceptable, a stator core, prior to having the coils inserted into the core slots, typically is visually inspected by a trained factory worker. Since stator cores may have twenty to forty-eight slots and may be several inches in height, such visual inspection is tedious and subject to human error. As explained above, however, such inspection is important since a distorted lamination may result in a failure of the motor incorporating such a stator. Failing to accurately identify a stator core having a distorted lamination may result in increased costs due to the return of motors that have failed and a loss of customer confidence.

Accordingly, it would be desirable and advantageous to provide an automated apparatus for reliably and quickly inspecting stator cores to better ensure that the stator laminations are properly aligned and not dimensionally distorted. It would also be desirable and advantageous to provide such an apparatus which is low in cost and which reduces the possibility for inspection errors.

An object of the present invention is to provide apparatus and methods for inspecting the dimensional characteristics of a stator core which apparatus and methods are reliable and substantially not subject to human error.

Another object of the present invention is to provide automated apparatus and methods for inspecting stator cores to determine whether the cores are dimensionally acceptable.

Still another object of the present invention is to provide automated apparatus and methods which may more quickly and reliably inspect stator cores and which also are inexpensive to utilize.

Still yet another object of the present invention is to enhance customer confidence by identifying potentially distorted stator laminations in a stator core prior to incorporating such a core into an electric motor.

SUMMARY OF THE INVENTION

These and other objects may be attained with methods and apparatus for automated inspection of stator cores which utilize, in one embodiment, a coherent light transmitter and a light detector. The light transmitter and detector, in the one embodiment, are optically aligned so that the detector is at least in the path of an optical signal, such as a coherent light signal, emitted from the light transmitter when such beam is substantially uninterrupted between the detector and the transmitter. The light transmitter and detector also are spaced from each other at a distance sufficient to allow a stator core to be moved, e.g., translated or rotated, therebetween. As an example, the light transmitter and detector may be secured to opposing, inwardly facing substantially planar surfaces of respective mounting members. The plate members are adjustable so that the distance therebetween may be adjusted depending upon the height of a particular stator core to be inspected.

Both the transmitter and detector are coupled, in one embodiment, to a control unit which includes a central processing unit (CPU) and an electronic memory storage, e.g., RAM and ROM. The apparatus further includes a robotic arm unit including stator core holding arms which grip the stator core at its exterior side surfaces so as to avoid interfering with the optical signal as it impinges on a substantially planar end surface of the stator core or is transmitted through an opening, e.g., slots, bore or through-holes, in the stator core.

In one embodiment, the robotic arm unit is configured to hold a stator core so that the center axis of the stator core is substantially perpendicular to the substantially planar surfaces of the mounting members. With such a configuration, at least a portion of the optical signal emitted from the light transmitter may be transmitted, substantially uninterrupted, through the stator bore when aligned therewith.

Prior to operation, the control unit is programmed to control the robotic arm so that the arm may move, e.g. translate and/or rotate, a stator core between the light transmitter and detector. A known acceptable stator core is then loaded onto the robotic arms and, under the control of the control unit, the stator core is moved, e.g., translated and/or rotated, in accordance with the pre-programmed sequence of movements. The control unit also causes the light transmitter to be enabled during such translations and/or rotations so that an optical signal may be emitted therefrom. As the robotic arm translates and/or rotates the stator core between the light transmitter and detector, signals representative of the optical signals received at the detector are transmitted from the detector to the control unit. The control unit samples, digitizes and stores the signal data in selected memory locations in the control unit memory. Such data, as hereinafter described, is utilized as the standard measurements, or standard data, in subsequent inspections.

In one embodiment of operation, and to inspect a stator core for dimensional distortions, the core to be inspected is loaded into the robotic arm unit. The control unit then causes the robotic unit to move the core between the light transmitter and detector in accordance with the preprogrammed sequence of movements. The control unit, of course, enables the transmitter to emit an optical signal as the core is moved between the light transmitter and detector. The detector may receive optical signals transmitted through openings in the stator core, and signals representative of received optical signals are transmitted from the detector to the control unit. The signals received at the control unit from the detector are digitized and stored in selected memory locations in the control unit memory. Once the robotic unit completes the preprogrammed sequence of movements, and the signals from the detector have been digitized and stored in the control unit, the control unit CPU then compares the measured stator core data for the subject core with the standard data.

If the measured data for the subject stator core is within an acceptable tolerance range as compared to the standard data, then the subject stator core may be passed on for further processing. However, if such measured data is not within such an acceptable tolerance range, then the stator core may be identified as unacceptable, or may at least be identified as a stator core requiring additional examination.

The above described apparatus and methods provide reliable and quick inspection of stator cores to ensure that the stator laminations have been properly aligned and are not distorted beyond acceptable tolerances. Further, the above described embodiment of the apparatus is low in cost and reduces the possibility for inspection errors.

BRIEF DESCRIPTION OF THE DRAWINGS

FIG. 1 is a plan view of a stator lamination.

FIG. 2 is a block diagram illustrating one exemplary embodiment of a stator core inspection apparatus.

DETAILED DESCRIPTION

FIG. 1 is a plan view of a stator lamination 10 having a plurality of teeth 12 which extend radially into a bore 14. Slots 16 between teeth 12 extend radially outwardly from the periphery of bore 14. The ends of teeth 12 and the open ends of slots 16 define the periphery of bore 14. Stator lamination 10 also includes bolt holes or through-holes 18A, 18B, 18C and 18D. Each through-hole 18A, 18B, 18C and 18D may be positioned substantially at a respective corner 20A, 20B, 20C and 20D of lamination 10.

Stator lamination 10 may be formed utilizing a high-speed press machine which forces a die through a strip of steel material. After being "punched" from the steel material, lamination 10 undergoes additional processing such as being heat-treated in a furnace. Lamination 10 may be arranged in a stack with a plurality of other substantially identical laminations to form a stator core (not shown in FIG. 1). As described above, many process steps may be performed on lamination 10 in the stator core formation process.

As a result of handling and processing, stator lamination 10 may be dimensionally distorted. Such distortions may adversely affect the dimensions of the stator slots 16, teeth 12, bore 14 and/or through-holes 18A, 18B, 18C and 18D, for example, depending upon the particular distortion. If a stator slot 16 or tooth 12 is distorted, for example, the magnet wire may be damaged when inserted within slot 16, or the dimensions of stator bore 14 may be adversely affected. Such distortions may adversely affect motor operation, and may even result in a motor failure.

One embodiment of an apparatus for automated inspection of stator cores to facilitate identification of dimensional distortions is shown in block diagram form in FIG. 2. In the illustrated embodiment, the inspection apparatus includes a combination coherent light transmitter and detector 10 and a light detector 12. The combination transmitter/detector 10 may, in some embodiments, be replaced by a transmitter only, and transmitter/detector 10 sometimes is referred to herein as transmitter 10.

Transmitter 10 and detector 12 are optically aligned with respect to one another so that when at least a portion of an optical signal emitted from transmitter 10 is substantially uninterrupted, at least a portion of detector 12 is within at least a portion of a path of the optical signal. Transmitter 10 and detector 12 also are spaced from each other at a distance sufficient to allow a stator core 14 to be translated and/or rotated therebetween. As an example, light transmitter 10 and detector 12 may be secured to opposing, inwardly facing surfaces of substantially planar surfaces of respective mounting members (not shown). The mounting members may be adjustable so that the distance between transmitter 10 and detector 12 may be adjusted depending upon the height of a stator core to be inspected.

Both transmitter 10 and detector 12 are electrically coupled to a control unit 16 which, in one embodiment, includes a central processing unit (CPU) and memory storage elements, e.g., ROM and RAM. The apparatus further includes a robotic arm unit 18 which includes arm members 20 (only one arm member 20 is shown in FIG. 2) configured to grip stator core 14 at its exterior side surfaces so as to avoid interfering with an optical signal emitted from transmitter 10 as it impinges on a substantially planar end surface 22 of stator core 14 or is transmitted through an opening, e.g., slots 24, bore 26 or through-holes 28A and 28B, in stator core 14.

As examples of commercially available equipment which may be utilized in implementing the above described inspection apparatus, transmitter 10 and detector 12 could be laser transmitters and detectors available from Lasiris Inc., 3549 Ashby, Saint-Laurent, Quebec, Canada, H4R 2K3. Control software and precision robots that could be utilized are commercially available from Adept Technology, Inc., 150 Rose Orchard Way, San Jose, Calif. 95134. Other known optical measurement systems are commercially available from LaserMike Inc., 6060 Executive Blvd., Dayton, Ohio 45424 and Keyence Corporation of America, 50 Tice Boulevard, Woodcliff Lake, N.J. 07675.

Prior to operation, control unit 16 is programmed to control robotic arm unit 18 so that unit 18 moves, e.g., translate and/or rotate, a stator core between transmitter 10 and detector 12. The programmed sequence of movements may provide that a core under inspection is translated and/or rotated between transmitter 10 and detector 12 to enable inspection of the stator bore diameter, slot openings, through-hole openings, and through-hole opening position relative to the stator bore. The specific selected manner in which the stator core may be moved may vary depending upon the specific stator configuration to be tested and the manufacturing constraints.

As an example of a scanning technique which may be practiced, control unit 16 may be programmed to execute a stop-and-shoot scanning sequence. With a stop-and-shoot inspection, when transmitter 10 is not enabled, robotic unit 18 is controlled by unit 16 to move the stator core 14 to a specific predetermined first position. Transmitter 10 is then enabled by control unit 16 for a predetermined time period so that an optical signal is emitted from transmitter 10 towards detector 12. Upon expiration of the predetermined time period, unit 16 then causes robotic unit 18 to move core 14 to a second position. Transmitter 10 is again enabled by unit 16 for the predetermined time period while core 14 is in the second position. Such operations are repeated until core 14 has been moved to each selected position.

Control unit 16 also is configured so that while the stop-and-shoot sequence is being executed, control unit 16 samples, in a timed sequence, the output signals are supplied by detector 12 to unit 16. The sampled signals may be digitized using a suitable analog-to-digital converter (not shown) and stored in the memory of control unit 16. Of course, an optical signal from transmitter 10 may not be transmitted to detector 12 for each stop-and-shoot position of the core 14, and under such circumstance, no output signal will be generated by detector 12. Under such circumstances, the memory location or locations in control unit 16 associated with that specific position of core 14 would have a value of zero stored therein.

If transmitter 10 is a combination transmitter/detector as shown in FIG. 2, then optical signals reflected by stator core 14 back to transmitter/detector 10 would cause transmitter/detector 10 to provide, to control unit 16, signals indicative of the intensity of such reflected signals. With such a configuration, unit 16 also would sample the signals supplied thereto by transmitter/detector 10, digitize the signal magnitudes and store such digitized values in respective memory locations.

As another example of a scanning technique which may be practiced, unit 16 may be programmed to execute a continuous scan. In a continuous scan mode of operation, control unit 16 causes robotic unit 18 to continuously move stator core 14 during the optical inspection operation. As the core 14 is moved, control unit 16 also enables transmitter 10 so that an optical signal may be continuously emitted by transmitter 10. The optical signal path between transmitter 10 and detector 12, of course, is intermittently interrupted by portions of core 14. Detector 12 supplies signals to control unit 16, and as with the stop-and-shoot technique, control unit 16 samples the signals supplied thereto by detector 12, digitizes such signals and stores such values in respective memory locations.

Once control unit 16 is programmed as explained above, a known acceptable stator core is loaded onto robotic arm unit 18 and under the control of control unit 16, the stator core is moved, e.g., translated and/or rotated, in accordance with the pre-programmed sequence to obtain "standard" or reference data. Specifically, the signals obtained from detector 12 during such scan of an acceptable core are digitized and stored in the memory of control unit 16. Such data is used, as hereinafter described, as the standard data to determine the acceptability of a stator core to be inspected. Of course, more than one known acceptable stator core for a particular core configuration could be scanned to obtain a range of acceptable detector signal values for the various stator core positions, or to identify an acceptable tolerance value, which can be positive or negative, or both, or a threshold, and which can be readily utilized in determining the acceptability of the core undergoing inspection.

Once the standard data has been determined for a particular core configuration, in one embodiment of operation, to inspect a stator core having such a configuration, the core to be inspected may be loaded into robotic arms 20. Control unit 16 then causes robotic unit 18 to move the core between light transmitter 10 and detector 12 in accordance with the preprogrammed sequence, e.g., stop-and-shoot or continuous scanning mode. Control unit 16, of course, also enables light transmitter 10 to emit an optical signal in the same manner which corresponds to the manner in which transmitter 10 was enabled when collecting the standard data for the subject core configuration. Detector 12 and/or transmitter/detector 10 supply signals to control unit 16 and such signals are digitized and stored in respective memory locations of unit 16. The data collected in scanning a core under inspection is sometimes referred to herein as measured data.

Once the measured data, in whole or in part, is collected for the subject stator core, the control unit CPU may then compare the measured stator core data with the standard data. Such comparison may be performed, for example, by comparing, for each position in which both standard and measured data has been obtained, the standard data elements and the measured data elements. If the measured data is within an acceptable tolerance range as compared to the standard data, then the subject stator core may not be identified as unacceptable. However, if such measured data is not within an acceptable range, then the stator core may be identified as unacceptable, or may at least be identified as a stator core requiring additional examination.

Many variations of the inspection apparatus and methods described above are possible. For example, rather than moving stator core 14, transmitter 10 and detector 12 could be moved by a robotic unit while core 14 is maintained stationary. Also, optical signals other than just coherent light signals could be utilized. For example, an optical signal (non-coherent) output by a light emitting diode (LED) could alternatively be used.

The above described apparatus and methods provide reliable and quick inspection of stator cores to ensure that the stator laminations have been properly aligned. Further, use of such apparatus and methods may reduce field failures and enhance customer confidence.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the inventions are to be limited only by the terms of the appended claims.

What is claimed is:

1. Apparatus for performing an inspection of a stator core for an electric motor, the stator core having a plurality of slots, said apparatus comprising:

an optical signal transmitter for flooding at least one stator core slot with an optical signal;

an optical signal detector positioned so that when at least a portion of the optical signal emitted from said transmitter is substantially uninterrupted, at least a portion of said detector is within at least a portion of a path of the optical signal, said detector spaced from said transmitter so that at least a portion of the stator core can be positioned therebetween; and a control unit for controlling relative movement between said optical signal transmitter and the core during the inspection so that data obtained during the inspection is representative of a plurality of core characteristics.

2. Apparatus in accordance with claim 1 wherein the optical signal emitted by said transmitter is coherent light.

3. Apparatus in accordance with claim 1 wherein said control unit is coupled to said transmitter and said detector.

4. Apparatus in accordance with claim 3 wherein said control unit is configured to enable said transmitter so that an optical signal may be emitted therefrom, said control unit further configured to receive an output signal from said detector indicative of the intensity of the optical signal received by said detector from said transmitter.

5. Apparatus in accordance with claim 1 further comprising a robotic arm unit.

6. Apparatus in accordance with claim 5 wherein said robotic arm unit comprises movable arm members and wherein said apparatus further comprises a control unit, said control unit being coupled to said robotic arm unit to control movement of said arm members, said control unit further being coupled to said transmitter and said detector, said control unit configured to control said robotic arm to move at least a portion of the stator core between said transmitter and said detector and to enable said transmitter so that an optical signal may be emitted therefrom while the stator core is positioned between said transmitter and said detector.

7. Apparatus in accordance with claim 6 wherein said control unit receives an output signal from said detector indicative of the intensity of the optical signal received by said detector from said transmitter, and said control unit processes the output signal from said detector to determine whether the stator core is dimensionally acceptable.

8. Apparatus in accordance with claim 7 wherein said control unit comprises a processor and a memory storage, and wherein to determine whether the stator core is acceptable, said processor is programmed to:

compare the magnitude of the signal received by said control unit from said detector with a prestored value in said memory storage; and if the difference between the signal magnitude and the prestored value is greater than a predetermined tolerance value, then identifying the stator core as at least potentially unacceptable.

9. Apparatus for performing an inspection of a stator core, the stator core having a plurality of slots, said apparatus comprising:

an optical signal transmitter for flooding at least one stator core slot with an optical signal;

an optical signal detector positioned so that when the optical signal emitted from said transmitter is substantially uninterrupted, at least a portion of said detector is within at least a portion of a path of the optical signal, said detector spaced from said transmitter so that at least a portion of the stator core can be positioned therebetween;

a robotic arm unit comprising at least one movable arm member; and a control unit coupled to said robotic arm unit for controlling relative movement between said optical signal transmitter and the core during the inspection so that data obtained during the inspection is representative of a plurality of core characteristics, said control unit further coupled to said transmitter and said detector, said control unit configured to control said robotic arm unit to move at least a portion of the stator core between said transmitter and said detector and to enable said transmitter so that an optical signal may be emitted therefrom while the stator core is moved between said transmitter and said detector, said control unit comprising a central processing unit and a memory storage, standard data for at least one core configuration stored in said memory storage.

10. Apparatus in accordance with claim 9 wherein the optical signal emitted by said transmitter is coherent light.

11. Apparatus in accordance with claim 9 wherein said control unit is configured to receive an output signal from said detector indicative of the intensity of the optical signal received by said detector from said transmitter, and said control unit is configured to process the output signal from said detector to determine whether the stator core is dimensionally acceptable.

12. Apparatus in accordance with claim 11 wherein said control unit comprises a processor and a memory storage, and wherein to determine whether the stator core is acceptable, said processor is programmed to:

compare the magnitude of the signal received by said control unit from said detector with the standard data; and if the difference between the signal magnitude and the standard data is greater than a predetermined tolerance value, then identifying the stator core as at least potentially unacceptable.

13. Apparatus in accordance with claim 9 wherein said control unit controls said robotic unit to operate in a stop-and-shoot scanning mode.

14. Apparatus in accordance with claim 9 wherein said control unit controls said robotic unit to operate in a continuous scanning mode.

15. A method for inspecting dimensions of a stator core using an optical signal transmitter and an optical signal detector coupled to a control unit, the stator core having a plurality of slots, the transmitter and detector being spaced at a sufficient distance with respect to one another to enable at least a portion of the stator core to be moved therebetween, the detector positioned so that when an optical signal is emitted from the transmitter, at least a portion of the detector is within at least a portion of a path of the optical signal if the optical signal is substantially uninterrupted, said method comprising the steps of:

positioning a first portion of the stator core having at least a first slot therethrough between the transmitter and the detector;

enabling the transmitter to emit an optical signal while the first portion of the core is positioned between the transmitter and detector so that the first slot is flooded with the optical signal;

generating a signal in the detector indicative of the intensity of the signal received by the detector while the first portion of the core is positioned between the transmitter and detector while the transmitter was energized;

positioning a second portion of the stator core having at least a second slot therethrough between the transmitter and the detector;

enabling the transmitter to emit an optical signal while the second portion of the core is positioned between the transmitter and detector so that the second slot is flooded with the optical signal;

generating a signal in the detector indicative of the intensity of the signal received by the detector while the second portion of the core is positioned between the transmitter and detector and while the transmitter was energized; and processing the signals generated in the detector to determine whether the core is dimensionally acceptable.

16. A method in accordance with claim 15 further comprising the step of storing standard data in a memory of the control unit.

17. A method in accordance with claim 16 wherein processing the signals generated in the detector to determine whether the core is dimensionally acceptable comprises the steps of:

digitizing the signals from the detector; and comparing the values of the digitized signals with the standard data.

18. A method in accordance with claim 15 wherein the control unit includes a processor and a memory storage, and wherein processing the signals generated in the detector to determine whether the core is dimensionally acceptable comprises the steps of:

comparing the magnitudes of the signals received by the control unit from the detector with the standard data; and if the difference between the signal magnitudes and the standard data is greater than a predetermined tolerance value, then identifying the stator core as at least potentially unacceptable.

19. A method in accordance with claim 18 wherein the control unit controls the robotic unit to operate in a stop-and-shoot scanning mode.

20. A method in accordance with claim 18 wherein the control unit controls the robotic unit to operate in a continuous scanning mode.

* * * * *